(12) United States Patent
Jones

(10) Patent No.: US 6,531,836 B2
(45) Date of Patent: Mar. 11, 2003

(54) AUTOMATIC LIGHT SWITCH

(76) Inventor: Kevin Jones, 2532 Main St., Jennings, MO (US) 63136

( * ) Notice: Subject to any disclaimer, the term of this patent is extended or adjusted under 35 U.S.C. 154(b) by 0 days.

(21) Appl. No.: 09/827,081

(22) Filed: Apr. 5, 2001

(65) Prior Publication Data

US 2002/0135323 A1 Sep. 26, 2002

Related U.S. Application Data

(60) Provisional application No. 60/195,115, filed on Apr. 6, 2000.

(51) Int. Cl.⁷ ................................................ H05B 37/02
(52) U.S. Cl. ....................... 315/360; 315/292; 315/293; 315/316; 307/140; 307/139
(58) Field of Search ................................ 315/292, 293, 315/316, 314, 315, 360, 362; 307/140, 141, 139, 126

(56) References Cited

U.S. PATENT DOCUMENTS

| | | | | |
|---|---|---|---|---|
| 4,279,012 A | * | 7/1981 | Beckedorff et al. ......... 364/104 |
| 4,344,000 A | * | 8/1982 | Schornack et al. ...... 307/132 E |
| 4,354,120 A | * | 10/1982 | Schornack .............. 307/132 E |
| 4,570,215 A | * | 2/1986 | Miura et al. ................. 364/140 |
| 5,160,853 A | * | 11/1992 | Simon et al. ................ 307/140 |
| 5,465,031 A | * | 11/1995 | Nilssen ........................ 315/362 |
| 5,473,204 A | * | 12/1995 | Temple ........................ 307/141 |
| 5,629,587 A | * | 5/1997 | Gray et al. .................. 315/292 |
| 6,124,674 A | * | 9/2000 | Wan ............................. 315/76 |

* cited by examiner

Primary Examiner—Don Wong
Assistant Examiner—Tuyet T. Vo
(74) Attorney, Agent, or Firm—George L. Williamson

(57) ABSTRACT

The present invention discloses a light switch designed physically similarly to a present day conventional light switch having a face plate and on/off switching capability for connection to standard house current using 110/115 volts AC electricity. The present invention discloses the light switch having memory capability wherein the light usage patterns actually used by the household resident can be stored into memory so that when the household residents are away from home they can activate the memory of the present invention so that the light switches are operated in their absence according to the actual usage pattern which has been exhibited by them while present in the house.

8 Claims, 2 Drawing Sheets

AUTOMATIC LIGHT SWITCH

This application claims benefit of Provisional Application Serial No. 60/195,115 filed on Apr. 6, 2000.

BACKGROUND OF THE INVENTION

1. Field of the Invention

The present invention relates generally to light switches, and, more particularly, is concerned with a light switch having memory capability for storing light usage patterns therein.

2. Description of the Prior Art

Light switches have been described in the prior art. However, none of the prior art devices disclose the unique features of the present invention. It is felt that a light switch capable of storing usage patterns would be useful.

In U.S. Pat. No. 5,160,853, dated Nov. 3, 1992, Simon, et al., disclosed a programmable timer for turning a light on and off in response to changing sunset, daylight savings time, and other programmable conditions. The programmable timer includes an input device, a microprocessor, and a switch. The input device provides calendar, geographical, and daylight savings information to the microprocessor, which stores the programming information. The microprocessor computes an effective switching time from the stored information. The microprocessor employs program logic that compares the effective switching time to the current time to generate a timing control signal. The timing control signal, in turn, causes the switch, to turn a light on and off. In the preferred embodiment, the microprocessor and the switch are included within a housing which mounts on a wall in place of a normal light switch. A liquid crystal display is disposed on a face of the housing to provide a read out of the programming information and of the time of day. The input device is disposed on the face of the housing and includes a key matrix having a plurality of finger settable key type programming switches. Information is programmed by depressing each key while the programming logic is in a particular program mode.

In U.S. Pat. No. 5,465,031, dated Nov. 7, 1995, Nilssen disclosed a self-contained programmable actuator which can easily be mounted directly onto the outside of the face plate of a standard wall switch having a built-in light dimmer. This actuator can be programmed to adjust the position of the dimmer's mechanical control input in accordance with a program that automatically repeats on a diurnal, weekly or other cyclical basis. The actuator includes a small battery, a miniature electric motor with a gear/linkage mechanism operable to engage with and to move the dimmers mechanical control input over its complete range, and a quartz clock-based programming means having programming input keys and time display means.

In U.S. Pat. No. 5,629,587, dated May 13, 1997, Gray, et al., disclosed a programmable lighting control system for advertising, decorative, artistic and Christmas lighting applications, which consists of a standalone controller, an optional power booster device, and a personal computer compatible software program. The controller receives power via a standard AC outlet receptacle and includes: a plurality of AC output receptacles for connection to either series or parallel connected Christmas tree type lights or the like; a microcontroller to provide timing and control signals that are applied to solid state switching devices to drive the outlet receptacles; a non volatile memory to store custom user defined lighting sequences; a rotary switch to enable the selection of either pre-programmed sequences or user defined sequences: and a serial communication port. The personal computer compatible software program enables the user to create custom lighting sequences, which can be downloaded to the light controller non-volatile memory via the serial port. The optional power booster device can be used to increase the output power capability of each of the individual controller output circuits.

In U.S. Pat. No. 4,279,012, dated Jul. 14, 1981, Beckedorff, et al., disclosed a programmable apparatus for providing random on/off control of electrical devices such as appliances. Such control may be programmed for an entire week, with different programming for each day, and with programming control over small blocks of time, e.g., thirty minutes. Programming is secured by the use of a combination or lock and, in addition, the AC line cord of the electrical device, which receives or does not receive AC power depending upon the status of the program, is locked into the apparatus. During operation, the program in the apparatus may be interrogated and displayed; otherwise, the time of day is displayed. The apparatus also includes a look-ahead feature, turning on an appliance, such as a television set, earlier than programmed in order to provide sufficient warm-up time.

In U.S. Pat. No. 4,344,000, dated Aug. 10, 1982, Schornack, et al., disclosed one form of a timer which is designed to be mounted over and behind a conventional wall switch cover plate and includes a two position time condition-setting arm, a rotatable and depressible time setting dial knob and an indicator on the front of the cover plate. When the arm is moved to a timer-on position, the indicator flashes to indicate that timer programming is needed. This may be achieved in real time over the first twenty-four hours after a 30 minute play period by depressing the knob acting as an on and off power switch control push button to turn the light circuit on and off in a normal manner. Fast normal programming is achieved by rotating the knob to various time settings and depressing the knob to se ON or OFF markers in timer memory. A full twenty-four hour programming is completed by either completing a full rotation of the knob over the full twenty-four hour time settings, which at least one ON and one OFF depression, or by a similar pair of knob depressions without such a full rotation, OFF markers then being automatically set by the time to complete the timer programming. The indicator comes steady on to indicate that the timer is fully programmed and in an automatic mode of operation. The automatic operation is temporarily overridden by depression of the knob or permanently overridden by a simple distinctive speed or time duration depression of the knob.

In U.S. Pat. No. 4,354,120, dated Oct. 12, 1982, Schornack disclosed an electrical timer which automatically actuates an output electrical load device such as electric light according to a program stored as markers in a memory unit over a 24-hour interval, whereupon the program is recycled. By actuating one or more electric lights within an empty dwelling, an illusion of occupancy is thus conveyed to an observer. In the preferred form of the invention the memory unit is a recirculating shift register. A daily variability of the timer output is provided to prevent precise daily replication of the load device duty profile. One version causes the program output to be delayed by 15 minutes on alternate days by alternately taking the output from the last or the next-to-last storage element of the shift register. The stored duty profile is in 15-minute blocks. A second version uses 30-minute blocks and minimizes possible output distortion during the transition from normal to delayed display by using two timing pulses 16 minutes apart to display the program output on alternate days 8 minutes early or 8 minutes late. The second version allows use of a smaller amount of memory storage.

In U.S. Pat. No. 4,570,215, dated Feb. 11, 1986, Chan disclosed a fully automatic programmable wall switch timer for controlling lighting circuits. The device provides user selected lighting circuit operation at predetermined event times, for predetermined event duration at said times, and at a selected light brightness or intensity level. The device is microprocessor controlled and is intended for installation in a standard wall switch box using existing wall switch plates. Included are a time of day and programming display and a three-way switch option. Separate switches are provided for isolating the unit from the power line, selecting lighting circuit operation, and advancing the display time. Additionally, various user-programming modes are provided by operation of said switches and in conjunction with each other.

While these automatic light switches may be suitable for the purposes for which they were designed, they would not be as suitable for the purposes of the present invention, as hereinafter described.

SUMMARY OF THE INVENTION

The present invention discloses a light switch designed physically similarly to a present day conventional light switch having a face plate and on/off switching capability for connection to standard house current using 110/115 volts AC electricity. The present invention discloses the light switch having memory capability wherein the light usage patterns actually used by the household resident can be stored into memory so that when the household residents are away from home they can activate the memory of the present invention so that the light switches are operated in their absence according to the actual usage pattern which has been exhibited by them while present in the house.

An object of the present invention is to store home light usage patterns of residents for later use when the residents are away from home. A further object of the present invention is to provide improved home security so the actual light usage pattern of the residents is used when the residents are away in order to deter thieves from the home. A further object of the present invention is to provide a timer for light usage when the residents are away from the home.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 2:
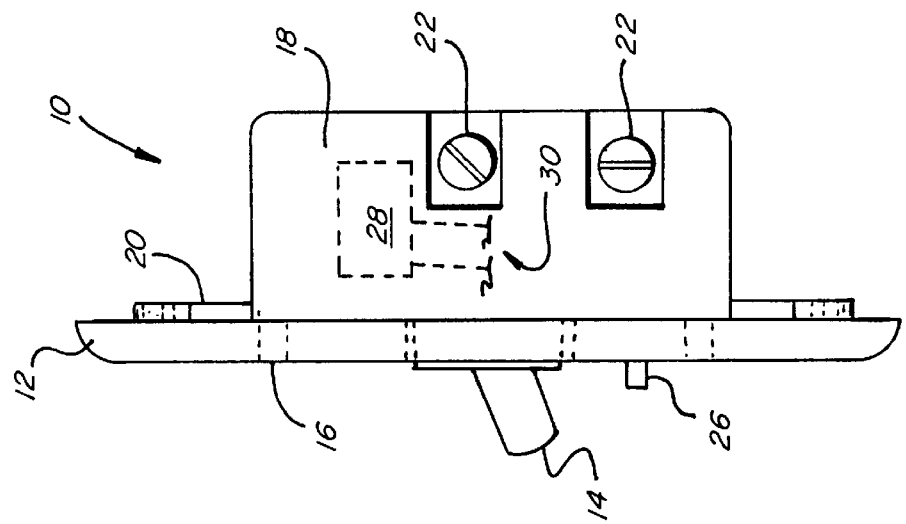
FIG. 2 is a side elevation view of the present invention.

With regard to reference numerals used, the following numbering is used throughout the drawings.
10 present invention
12 face plate
14 on/off switch
16 holes for fasteners
18 switch body
20 mounting flange
22 electrical contacts
24 switch for automatic mode
26 switch for manual mode
28 computer
30 electrical connection means
32 power supply
34 lights
36 thicker face plate
38 pushbutton

DESCRIPTION OF THE PREFERRED EMBODIMENT(S)

Figure 1:
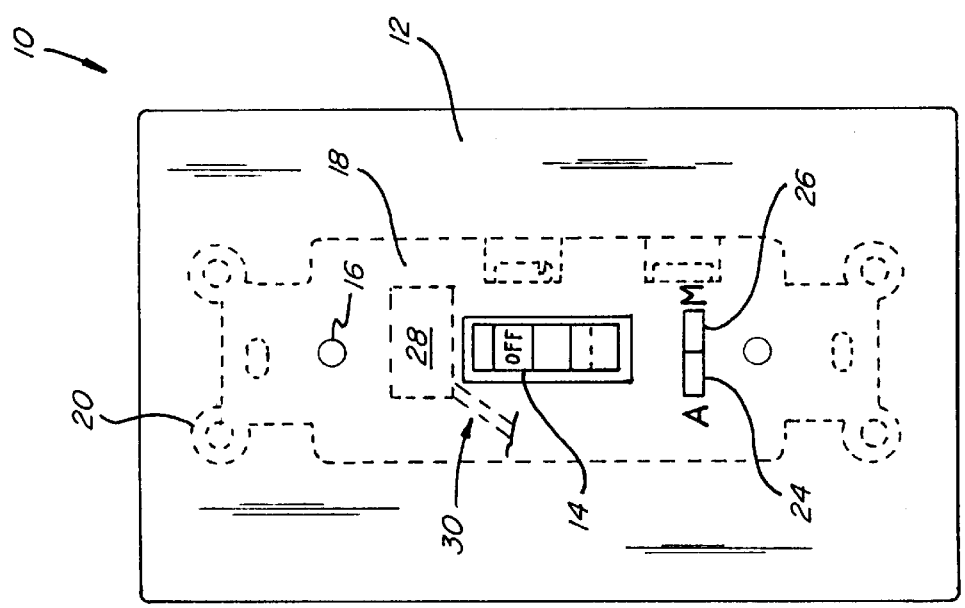
FIG. 1 is a front elevation view of the present invention.

Turning now descriptively to the drawings, in which similar reference characters denote similar elements throughout the views, FIGS. 1 through 2 illustrate the present invention wherein a light switch having usage pattern memory is disclosed.

Turning to FIG. 1, therein is shown the front elevation view of the present invention 10 showing a face plate 12 along with on/off switch 14 and holes for fasteners 16 whereupon the face plate 12 can be connected to a receiving socket of a residence in the conventional manner as would be done by one skilled in the art. The switch body 18 and mounting flanges 20 are also shown along with a switch for selecting the automatic mode of operation 24 or the manual mode of operation 26. Also shown is the computer 28, CPU (central processing unit), or microchip as applicable, along with electrical connection means 30 which are used to make all necessary electrical connections as would be done in the standard manner by one skilled in the art.

Turning to FIG. 2, therein is shown a side elevation view of the present invention 10 showing the switch body 18 along with the on/off switch 14 having upper and lower mounting flanges 20 for being fastened to the electrical socket in the wall of a residence in the conventional manner. Also shown are a pair of electrical contacts 22 with fastening means whereby standard 110–115 AC volt wires can be connected thereto. The switch body 18 contains a means for a computer which has memory capability for checking and monitoring the switch patterns and means for recording when the switch is on and off over an extended length of time. Also shown is the computer 28, CPU (central processing unit), or microchip along with electrical connection means 30 which are used to make all necessary electrical connections as would be done in the standard manner by one skilled in the art. The switch body also has means for automatic switching capabilities which are able to operate light switch 18 in an automatic manner when the household residents are away. A switch for selecting the automatic mode of operation 24 (not visible) or the manual mode of operation 26 is also shown. The memory of the present invention 10 will record and store in memory the exact usage pattern of the residents of the home over a prolonged period of time, e.g., one week. Thereafter, when the residents are away from home, the switch 10 will operate the residence lights in the exact same pattern as was used by the residents when they were at home. The light switch 18 also has the capability to function as a normal light switch.

Figure 3:
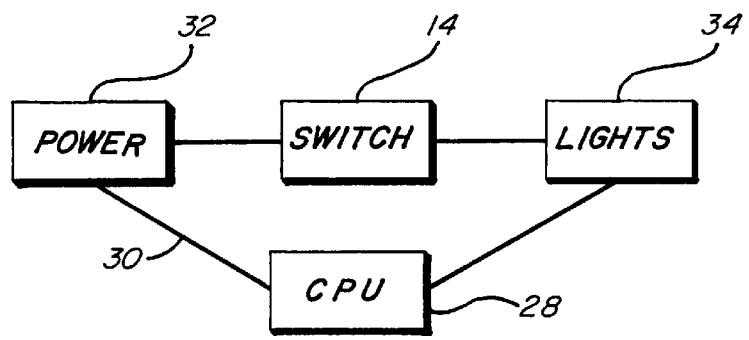
FIG. 3 is a schematic diagram of parts of the present invention.

Turning to FIG. 3, therein is shown a power supply means 32 which could be conventional 110 volt alternating current or the like, the switch 14 of the present invention, the house or building lights 34, and the CPU 28 along with electrical connector 30. The CPU 28 has the ability to receive and transmit data to and from the power supply 32, switch 14, and light system 34.

Figure 4:
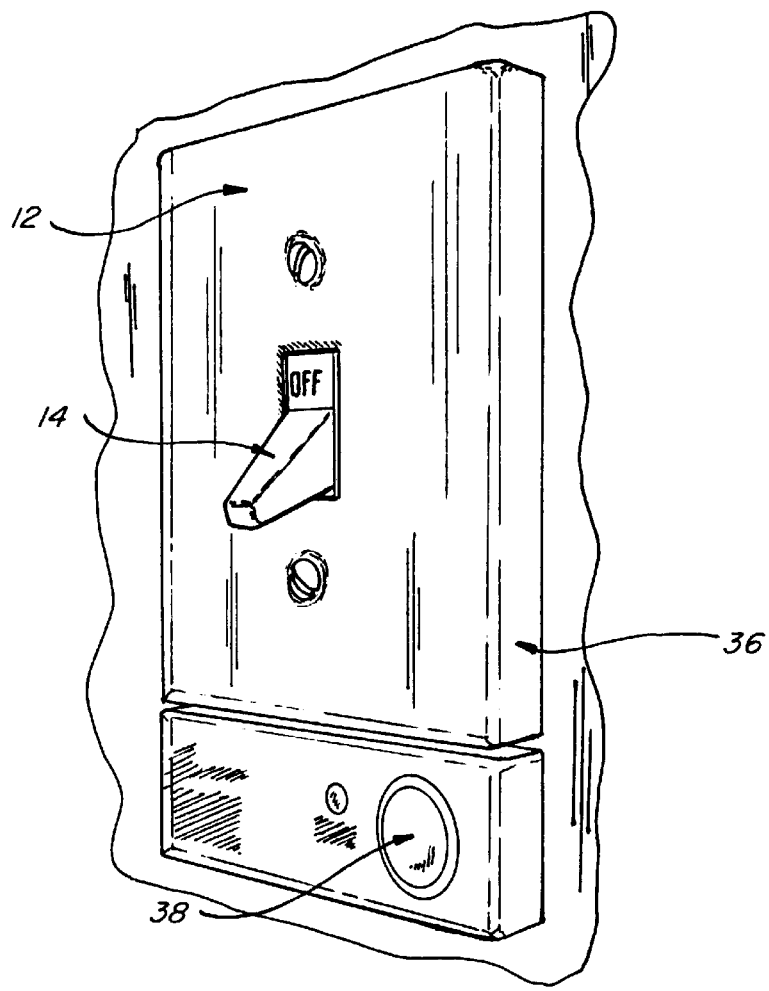
FIG. 4 is a perspective view of parts of the present invention.

Turning to FIG. 4, therein is shown the face plate 12, main switch 14, a thicker face plate shown at 36 to accommodate the wiring and microchips or the like of the present invention, and a pushbutton 38 for controlling the recording and playback system along with the LED light to indicate that the system is active.

What is claimed is:

1. In an apparatus for recording and playback of a home lighting system pattern which uses a conventional 110 volt alternating current light switch, the improvement comprising:
    a) a conventional light switch body, said switch body for use with conventional 110 volt alternating current, said switch body being complementarily sized and shaped as a conventional light switch body;
    b) an on/off switch for turning said switch on and off,
    c) means for a computer disposed in said switch body, whereby the pattern of usage of the lighting system can be recorded;
    d) means for controlling said computer, and;
    e) means for electrical connection of said on/off switch, said means for a computer, and said means for controlling said computer.

2. The apparatus of claim 1, wherein said means for a computer further comprises storage capacity for at least one week of operating data.

3. The apparatus of claim 2, wherein said on/off switch further comprises a manually operated on/off switch.

4. The apparatus of claim 3, wherein said on/off switch further comprises means for automatic operation of said on/off switch.

5. The apparatus of claim 4, wherein said means for controlling said computer further comprises one pushbutton.

6. A method for recording and playing back a lighting system pattern utilizing a conventional 110 volt alternating current light switch, comprising the steps of:
    a) recording the pattern of light usage of the light system using a computer;
    b) storing the pattern of light usage of the light system using a computer;
    c) playing back the pattern of light usage of the light system using a computer;
    d) electrical connecting all elements of the lighting system and computer; and,
    e) placing the computer and electrical connections in a conventional light switch body.

7. The method of claim 6, wherein said recording period is at least one week.

8. The method of claim 7, further comprising the step of mounting a single light switch pushbutton onto said switch body for controlling said computer.

* * * * *